3,253,031
METHOD FOR THE PREPARATION OF CRUDE DIPHENYL METHANE DIAMINE
Eugene L. Powers, New Martinsville, W. Va., assignor to Mobay Chemical Company, Pittsburgh, Pa., a corporation of Delaware
Filed Aug. 16, 1962, Ser. No. 217,340
9 Claims. (Cl. 260—570)

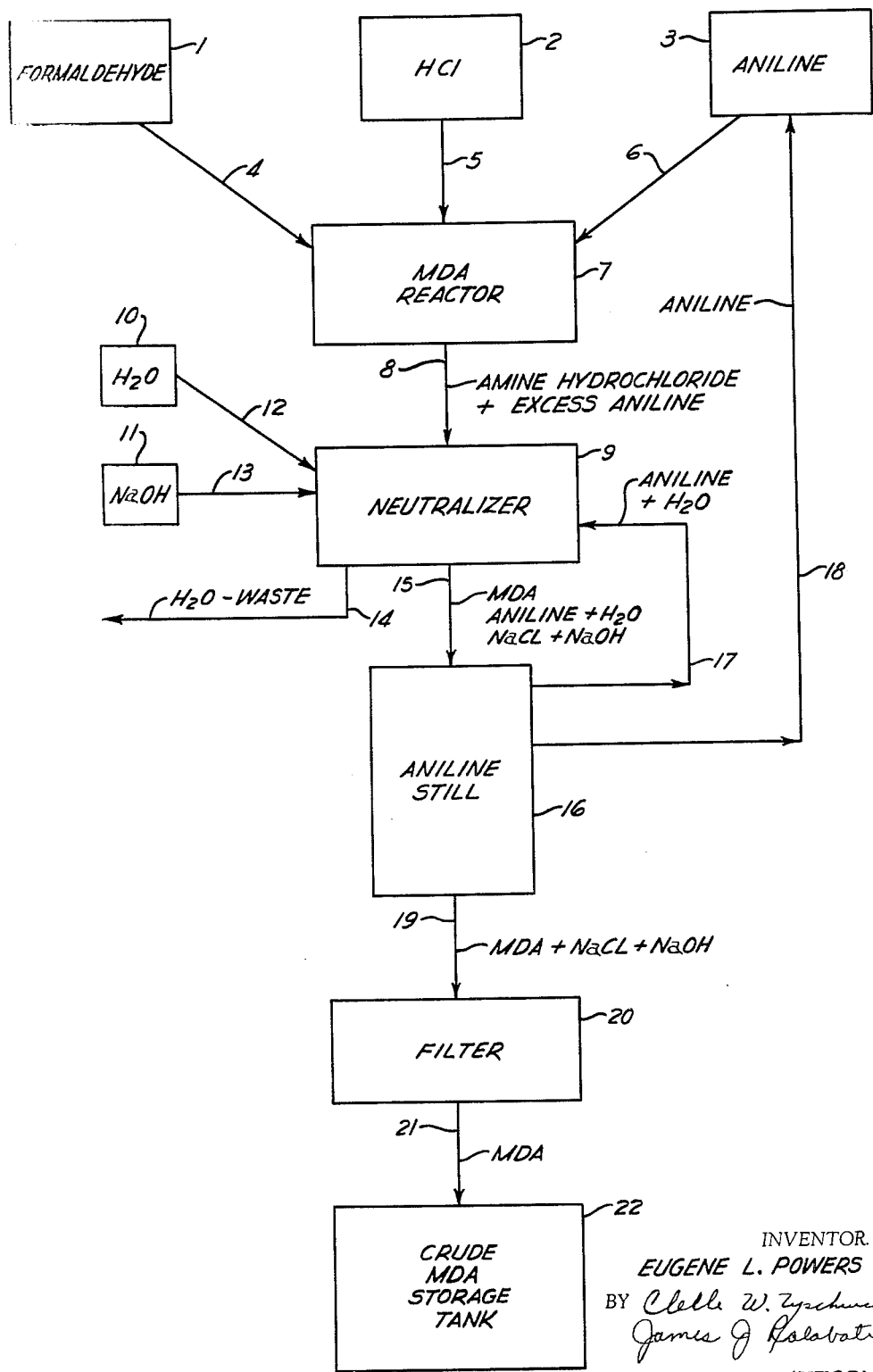

This invention relates to an improved method for the preparation of amines made by an acid catalyzed condensation process. More specifically, the unique concept of this invention resides in an improved method for making organic amines whereby undesirable residues and by-products are conveniently removed or separated from the amine products.

It has been known that in the manufacture of high boiling amines, diamines or polyamines, by various acid catalyzed processes, impurities and by-products result which, if allowed to remain, would render the final amine product less commercially usable. This is particularly true in the preparation of diphenyl methane diamine (referred to as MDA) by the acid catalyzed process wherein salt formed and excess caustic are residual products that remain in the concentrated crude diphenyl methane diamine. If these impurities were allowed to remain in the crude diphenyl methane diamine, they would interfere with and limit the use of which the diphenyl methane diamine may be put. For example, the diphenyl methane diamine is commercially used in the preparation of diisocyanates particularly in the production of polyurethane plastics. The crude diphenyl methane diamine contains these above impurities which have been difficult and relatively expensive to remove. If these impurities remain, they would be subsequently carried over to the isocyanate products produced and would present problems in the preparation of a commercially desirable product. Also, these impurities such as NaOH would hinder subsequent phosgenation steps, and would be detrimental toward desirable yields and conversion.

It is, therefore, an object of this invention to provide an improved method for making high boiling amines. It is a further object of this invention to provide a method for making crude amines whereby the percentage of impurities in said amines are kept to a minimum. Another object of this invention is to provide a method for the preparation of diphenyl methane diamine whereby the aniline content of removed waste water is kept to a minimum. Still another object of this invention is to provide an improved method for removing the salt impurities formed in a crude diphenyl methane diamine production. A still further object of this invention is to provide a method for the production of diphenyl methane diamine whereby the water and aniline impurities are first removed and subsequently, the sodium chloride salt impurities are removed. The foregoing objects and others which will become apparent from the following description are accomplished in accordance with this invention, generally speaking, by providing an improved method for the preparation of high boiling amines, and particularly for the preparation of diphenyl methane diamine.

Although this present invention applies to all amines prepared by an acid catalyzed condensation process, for the sake of clarity, the invention will be described with reference to the production of the above-mentioned diphenyl methane diamine. The present prior art process of preparing diphenyl methane diamine is to react formaldehyde with aniline in the presence of hydrochloric acid. The resulting product is an amine hydrochloride mix containing residual aniline. This mix is then neutralized, generally with sodium hydroxide and/or sodium carbonate or other bases to form a crude diphenyl methane diamine composition (methylenedianiline or MDA). In this neutralization step, generally sodium chloride salts are formed which must be removed from the diphenyl methane diamine composition together with the other impurities present therein. The presently available prior art processes remove this sodium chloride salt by washing the diphenyl methane diamine composition with fresh water or water having a very low salt content. This wash water is then drawn off from the production system. It has been found that in using this process for removing the sodium chloride salt, comparatively large amounts of residual aniline also are lost to the system via the wash water. It has been found that invariably this wash water when drawn off will contain about 3% aniline. If desired, the aniline in the washed water may be removed by further and expensive steps, and generally is allowed to remain in the washed water and disposed of together with the salt water waste products. Aniline is considered to be a substantially toxic chemical and aniline poisoning may be caused by inhaling vapors, etc. This 3% aniline that is present in the wash water may be considered to be dangerously toxic and may represent handling and waste disposal problems if allowed to remain in the water. The process of this invention not only reduces the aniline content in any waste water removed from the system, but reduces it to such a low concentration as to be considered relatively insignificant for toxic considerations.

A further consideration in the continuous process for the manufacture of diphenyl methane diamine is the amount of aniline lost by washing to remove the other impurities. If the washed water contains about 3% aniline for each run, it is quite apparent that in a series of runs (such as in a continuous process) significant amounts of aniline will be lost to the process unless recovered by expensive further distillation techniques. The process of this invention, together with the above reduced toxic consideration, provides a bonus advantage over the prior art processes by reducing, to a substantial amount, the aniline that is lost from the system. It can be seen, therefore, that the present invention provides a process that not only maintains the degree of aniline within a substantially non-toxic range, but also retains and utilizes in the system substantial amounts of aniline heretofore lost in the prior art process, or requiring further expensive distillation means to recover same.

As mentioned in the above discussion, it has become desirable to utilize crude diphenyl methane diamine in the production of crude isocyanates. To do this, one must remove all the salt of neutralization and any excess base or caustic present from neutralization. The process of this invention provides a method whereby crude diphenyl methane diamine is prepared by a process more economical than and devoid of substantially any dangerous toxic conditions present in the prior art process. In the present invention, the aniline present after the neutralization step is removed by distillation of the excess aniline along with residual water present. It was surprising to find that upon distilling off water and aniline from the neutralized mix, sodium chloride and sodium hydroxide salts that are present will be rendered substantially insoluble in the remaining composition. The sodium chloride precipitate then may be removed simply and economically by filtration means. It should be mentioned that it is critical to the process of this invention that the aniline and water be removed from the neutralization mix prior to the removal of the sodium chloride salts. This sequence of steps result in less aniline being present in the system at the salt removal stage and correspondingly less aniline present in salt subsequently removed.

The accompanying drawing illustrates a flow diagram setting forth the process steps of this invention. This flow diagram illustrates a preferred embodiment of this invention, however, it should be noted that specific examples and the specifics set forth in the drawing are given for the purpose of illustration and not limitation.

In the drawing, the diphenyl methane diamine (methylenedianiline) is prepared by adding formaldehyde from formaldehyde tank 1 to an equimolar aqueous solution of aniline from tank 3 and hydrogen chloride from tank 2. The formaldehyde passes from tank 1 through feed line 4 to the reactor 7. Correspondingly, the aniline and HCl are introduced to the reactor through feed lines 6 and 5 respectively. The reactor 7 is a jacketed glass-lined agitated vessel having therein temperature control means. The aniline-formaldehyde reaction product formed therein is kept under constant agitation and heated to a temperature up to 100° C. to give a crude diphenyl methane diamine. When the addition of the formaldehyde to the aniline hydrochloride solution is accomplished, the reaction mixture is heated until the reaction is complete. The aqueous solution of amine hydrochloride thus formed is added through feed line 8 to a neutralizer 9. A solution of sodium hydroxide and water is introduced into neutralizer 9. Upon addition of the amine hydrochloride to the sodium hydroxide solution, it is important that the pH of the solution be adjusted to the basic side. The waste water is removed and the neutralized amine layer is then passed from neutralizer 9 through line 15 to aniline still 16. The neutralized composition that passes from the neutralizer to the still 16 contains crude diphenyl methane diamine, aniline, water, sodium chloride and sodium hydroxide. In still 16, the residual water and the unreacted aniline are distilled off, thus rendering the neutralized composition substantially anhydrous. The resulting solution contains insoluble sodium chloride salts. The resulting composition (after the aniline and water have been removed) is passed from the still 16, through line 19 to a filter means 20. The filter means 20 may be any conventional commercial filtering means, such as, for example, a horizontal plate filter which is commercially used. The solution that passes into the filter from line 19, contains the crude diphenyl methane diamine plus the undissolved or residual sodium chloride salt. Also present is small quantities of sodium hydroxide. The hot crude diphenyl methane diamine is then filtered by means 20 to remove the residual salt present in the solution at a temperature above the freezing point of the amine. The remaining composition thus is passed from line 21 to crude diphenyl methane diamine storage tank 22.

As was mentioned in the preceding discussion, this process may be used to prepare other high boiling amines other than diphenyl methane diamine. In this instance, other aromatic amines may be used in place of or with the aniline above discussed. These amines would be those having the formula R—$(NH_2)_x$, wherein R is an organic nucleus and $x$ is an integer having a value of from 1 to 4. Apart from the aniline, those aromatic amines which are preferred for use in the process of this invention are o- and m-substituted anilines such as toluidines and alkyl aniline, chloroaniline, anisidines, nitroanilines, m-phenylene diamine and substituted m-phenylene diamines such as m-toluylene diamine and chloro-m-phenylene. The above aromatic compositions may contain ortho and meta substituents such as, alkoxy groups or halogen substituents. These substituents may also be found on the nitrogen atoms of the amino groups. If desired, these amines may be used in combination with each other rather than in combination with aniline or by themselves.

Also in the preferred embodiment of this invention, the acid used with the aniline and the formaldehyde is hydrogen chloride, other mineral or organic acids may be used for example, acetic or sulphuric acids or the like.

Whatever system is used, the formulation must be adjusted to produce an essentially saturated aqueous salt phase so as to prevent less of the amine through solubility.

The following examples will more specifically define the conditions and particulars of a preferred embodiment of this invention:

*Example 1*

This process is conducted in such a way that greater than 75 percent diamine is formed. 2400 ml. of concentrated hydrochloric acid are mixed with 2230 ml. aniline with cooling. 596 ml. of 37 percent formaldehyde are added, with agitation, keeping the temperature below 70° C. When the formaldehyde addition is completed, the resulting solution is heated to about 100° C. and held there for several hours. 2248 gms. of 44 percent sodium hydroxide is added to neutralize the hydrochloric acid. The pH is checked to be sure it is greater than 7. Agitation is stopped and the layers allowed to separate. The bottom layer (waste water) is drawn off and discarded. The top layer contains crude diphenyl methane diamine, unreacted aniline, residual water, sodium chloride, and sodium hydroxide. This layer is put into a distillation apparatus where first the water and then the aniline is distilled out. The still contents are then filtered to remove the sodium chloride and sodium hydroxide. The filtrate is crude diphenyl methane diamine containing at least 75 percent diphenyl methane diamine. The total chlorine content of the product is 0.05 percent and the pH of the product in the presence of distilled water is 7.

*Example 2*

This process is conducted in such a way that at least 50 percent diamine is formed. 4420 ml. of concentrated hydrochloric acid is mixed with 4100 ml. of aniline. 1620 ml. of 37 percent formaldehyde is added with stirring. After the addition of the formaldehyde is completed, the solution is heated to over 90° C. and held there for about 2 hours. 3600 gms. of 50 percent sodium hydroxide is added to neutralize the hydrochloric acid. The pH is checked to be sure it is greater than 7. Agitation is stopped and the layers allowed to separate. The bottom layer (waste water) is drawn off and discarded. The top layer contains crude diphenyl methane diamine, unreacted aniline, residual water, sodium chloride and sodium hydroxide. This layer is put into a distillation apparatus where first the water and then the aniline is distilled out. The still contents are then filtered to remove the sodium chloride and sodium hydroxide. The filtrate is crude diphenyl methane diamine containing 50–75 percent diphenyl methane diamine.

*Example 3*

This process is conducted in such a way that greater than 70 percent diphenyl methane diamine is formed. 11830 ml. of 6 percent hydrochloric acid is mixed with 1823 ml. of aniline with cooling. With the solution temperature less than 75° C., 700 ml. of 37 percent formaldehyde is added with stirring. After the addition of the formaldehyde is completed, the resulting solution is heated to about 100° C. and held for about 4 hours. The hydrochloric acid is neutralized with 1600 gms. of 50 percent sodium hydroxide. The pH is checked to be sure it is greater than 7 and 3482 gms. of sodium chloride are added. Agitation is stopped and the layers separated. The bottom layer (waste material) is drawn off and discarded. The top layer contains crude diphenyl methane diamine, unreacted aniline, residual water, sodium chloride, and sodium hydroxide. This layer is put into a distillation apparatus where first the water and then the aniline are distilled out. The still contents are filtered to remove sodium chloride and sodium hydroxide. The filtrate is crude diphenyl methane diamine containing at least 70 percent diphenyl methane diamine.

Example 4

This process is conducted in such a way that greater than 85 percent diamine is formed. 1965 ml. of concentrated hydrochloric acid is mixed with 1824 ml. of aniline. 245 ml. of 37 percent formaldehyde is added, with agitation, keeping the temperature below 70° C. When the formaldehyde addition is completed, the resulting solution is heated to 90–100° C. and held there for about 2–4 hours. 2050 gms. of 39 percent sodium hydroxide is added to neutralize the hydrochloric acid. The pH is checked to be sure it is greater than 7. Agitation is stopped and the layers allowed to separate. The bottom layer (waste water) is discarded. The top layer contains crude diphenyl methane diamine, unreacted aniline, residual water, sodium chloride and sodium hydroxide. This layer is put into a distillation apparatus. First the water and then the aniline are distilled out. The still contents are filtered to remove sodium chloride and sodium hydroxide. The filtrate is crude diphenyl methane diamine containing at least 85 percent diphenyl methane diamine.

Example 5

This process is conducted in such a way that greater than 35 percent diamine is formed. 20 gram-moles of hydrochloric acid at a concentration of from 6 to 36 percent is mixed with 1824 ml. of aniline. From 2.5 to 14.3 gram-moles of formaldehyde are added, with agitation, keeping the temperature of the reacting solution between 35° and 100° C. The resulting solution is heated to 90°–100° C. and held there for ½ to 4 hours. 1600 gms. of 50 percent sodium hydroxide is added to neutralize the acid. Water to dissolve the excess sodium chloride or sodium chloride to saturate the water is added depending upon the concentration of the hydrochloric acid used. The pH is checked to be sure it is greater than 7. Agitation is stopped and the layers allowed to separate. The bottom layer (waste water saturated with sodium chloride) is discarded. The top layer contains crude diphenyl methane diamine, unreacted aniline, residual water, sodium chloride, and sodium hydroxide. This layer is put into a distillation apparatus. First, the water and then the aniline are distilled out. The still contents are filtered to remove sodium chloride and sodium hydroxide. The filtrate is crude diphenyl methane diamine containing 35–95 percent diamine.

Although the invention has been described in considerable detail in the foregoing, it is to be understood that such detail is solely for the purpose of illustration and that many variations can be made by those skilled in the art without departing from the spirit and scope of the invention except as set forth in the claims.

What is claimed is:

1. A method for the preparation of amines which comprises contacting formaldehyde with an amine of the general formula $$R-(NH_2)_x$$

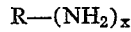

wherein R is a monocyclic aromatic radical and $x$ is an integer having a value of 1 to 4, in the presence of an acid, thereby forming an acidic reaction mixture, neutralizing said acidic reaction mixture with a base, distilling the neutralized product whereby an excess of the initial amine is removed, precipitating salts of neutralization by said distillation step, thereby rendering the salts of neutralization insoluble in said resulting neutralized product, and thereafter removing said precipitated salts from said resulting neutralized product by filtration.

2. The method of claim 1 wherein said amine is aniline.

3. The method of claim 2 wherein said acid is hydrochloric acid.

4. A method of preparing methylene dianiline which comprises adding formaldehyde to an aqueous solution of aniline and hydrogen chloride, maintaining the resulting formaldehyde-aniline reaction mixture at a temperature from about 10° C. to about 120° C., adding said reaction mixture to an aqueous solution of sodium hydroxide to form thereby a crude mix comprising aniline, $H_2O$, sodium chloride and methylene dianiline, removing said aniline and $H_2O$ from said crude mix by distillation thereby rendering said sodium chloride insoluble in the resulting solution, and subsequently filtering said resulting solution to remove said sodium chloride therefrom.

5. The method of claim 4 wherein said formaldehyde-aniline reaction mixture is added to an aqueous solution of sodium hydroxide until a resulting solution is obtained having a pH above 7.

6. The method of claim 4 wherein said formaldehyde-aniline reaction mixture is maintained at a temperature of from about 50° C. to about 120° C. for up to about 6 hours.

7. A method for removing sodium chloride impurities from a crude methylene dianiline solution containing said impurities which comprises distilling said crude methylene dianiline solution to remove water and aniline, the resulting solution containing insoluble sodium chloride, and subsequently filtering said resulting solution at an elevated temperature to remove substantially all of said insoluble sodium chloride.

8. The method of claim 7, wherein said resulting solution is heated to a temperature up to about 250° C. first prior to filtering.

9. The method of claim 7 wherein said resulting solution is heated to a temperature of from about 100° C. to about 225° C. just prior to filtering.

References Cited by the Examiner

UNITED STATES PATENTS

| | | | |
|---|---|---|---|
| 1,591,384 | 7/1926 | Homolka | 260—570 |
| 2,015,696 | 10/1935 | Semon | 260—570 |
| 2,818,433 | 12/1957 | Erickson | 260—570 |
| 2,938,054 | 5/1960 | Demers et al. | 260—570 |
| 2,974,168 | 3/1961 | Sharp et al. | 260—570 |

CHARLES B. PARKER, *Primary Examiner.*